J. LIMING.
Velocipede.
No. 105,701.
Patented July 26, 1870.
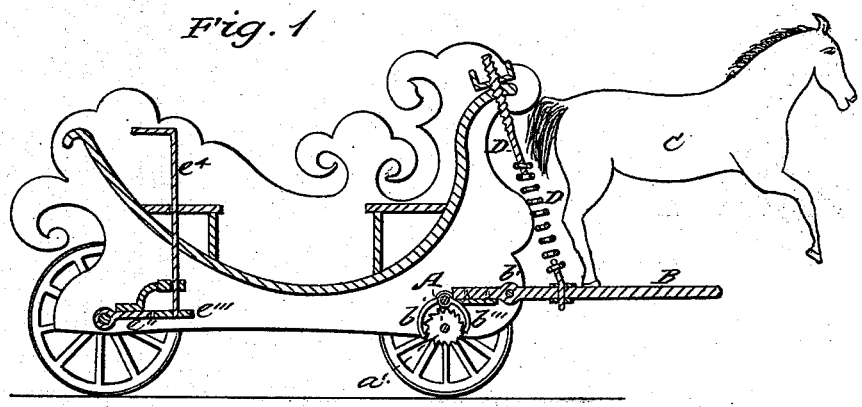
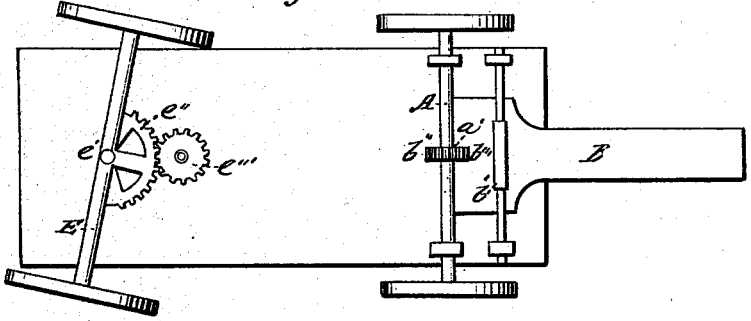
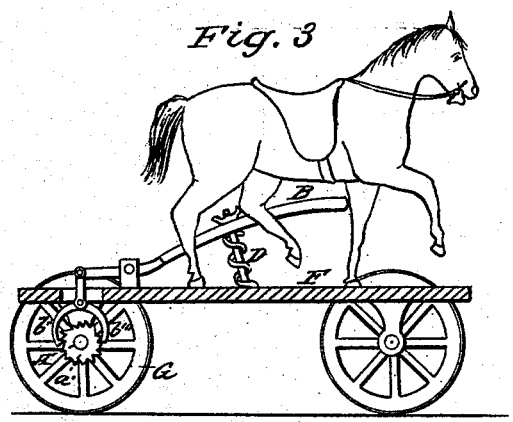

United States Patent Office.

JOHN LIMING, OF PHILADELPHIA, PENNSYLVANIA.

Letters Patent No. 105,701, dated July 26, 1870.

IMPROVEMENT IN COMBINED HOBBY-HORSE AND CARRIAGE-MOTOR.

The Schedule referred to in these Letters Patent and making part of the same.

I, JOHN LIMING, of the city of Philadelphia, in the State of Pennsylvania, have invented a certain Improved Combination of a Hobby-Horse on wheels, with a spring-lever, pawls, and ratchet-toothed wheel, of which the following is a specification.

Nature and Object of the Invention.

My invention relates to a combined arrangement of a hobby-horse and carriage, with a spring platform-lever, pawls, and ratchet-wheel, in such a manner that, when up-and-down motions are given to the platform or spring levers by the rider of the horse, the carriage and horse will be moved forward thereby.

Description of the Accompanying Drawing.

Figure 1 is a vertical longitudinal section of a hobby-horse and carriage, showing my invention applied thereto.

Figure 2 is a plan view of the under side of fig. 1.

Figure 3 is a modification in the application of the invention.

General Description.

The wheels of the front axle A are fixed theron, and the axle rotates on its usual bearings under the body of the carriage, In the middle of the said axle A, figs. 1 and 2, a ratchet-toothed wheel, $a'$, is fixed.

The platform or lever B, in said fig. 1, supports the horse, and turns upon a cross-bar, $b'$, as its fulcrum, and to its inner or weight end a pair of pawls, $b''\ b'''$, are pivoted or articulated, and applied so as to swing freely downward and come into contact with the ratchet-toothed wheel $a'$.

One of the pawls has a hooked catch at its lower end, which catches under the teeth of the ratchet-wheel in its upward movement, and thus pulls the wheel around as that end of the lever B rises; while the pawl at the opposite side has a straight end which enters between the teeth on the opposite side of the ratchet-wheel, and pushes the latter around as the said pawl is moved downward by the action of the spring D on the lever B; but, while moving in their respective contrary directions, they slip over the teeth of the said wheel.

The platform or lever B, with the horse and rider, as shown in fig. 1, are supported by the adjustable spring D, which suspends its power-arm from the upper part of the body of the carriage, and, as the rider of the horse, aided by the spring D, gives alternating up-and-down motions to the horse C, the two pawls $b''\ b'''$ alternately pull and push on the teeth of the ratchet-wheel, and thus give continuous rotary motion to the axle A and its wheels, and, consequently, the continuous forward movement of the carriage and horse.

The rear axle E is attached to the bottom of the body of the carriage by a pivot at $e'$, and at this part of the axle a toothed sector, $e''$, is fixed in a horizontal position and gears into a pinion, $e'''$, the shaft $e^4$ of which latter extend upward through the bottom of said carriage, and has a crank-handle at its upper end, whereby the occupant of a seat in the rear part of the carriage can vibrate the rear axle, and thus guide the advancing movement of the carriage and horse.

In fig. 3 a modification in the application of the invention is shown, wherein the horse is fixed rigidly upon the floor of a wheeled carriage, F, and the said carriage is caused to move forward by the rider in using his feet to vibrate the actuating spring lever B and pawls $b''\ b'''$, which connect with the ratchet-wheel on the rear axle of said carriage F.

It is intended to apply two of the levers B in this modification, fig. 3, one on each side of the horse, to operate in connection with two respective ratchet-toothed wheels on the axle A, with their respective pawls $b''\ b'''$, so that the feet of the rider of the horse may be used in an alternating up-and-down manner to work the said spring levers.

Claim.

I claim as my invention—

The combined arrangement of a hobby-horse and carriage, with the spring-lever platform B, pawls $b''\ b'''$, and ratchet-wheel $a'$, operating together as and for the purpose hereinbefore described and set forth.

JOHN LIMING.

Witnesses:
 BENJ. MORISON,
 WM. H. MORISON.